United States Patent
Joubert et al.

(10) Patent No.: US 6,426,810 B1
(45) Date of Patent: Jul. 30, 2002

(54) ILLUMINATION SYSTEM FOR AN ELECTROOPTIC COLOR DISPLAY SCREEN

(75) Inventors: Cécile Joubert, Paris; Brigitte Loiseaux, Villebon sur Yvette; Jean-Pierre Huignard, Paris; Anne Delboulbe, Bagneux, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 08/817,825

(22) PCT Filed: Sep. 4, 1996

(86) PCT No.: PCT/FR96/01348

§ 371 (c)(1),
(2), (4) Date: May 7, 1997

(87) PCT Pub. No.: WO97/10528

PCT Pub. Date: Mar. 20, 1997

(30) Foreign Application Priority Data

Sep. 12, 1995 (FR) .................................. 95 10657

(51) Int. Cl.[7] .................................................. G02B 5/32
(52) U.S. Cl. .................................................... 359/15
(58) Field of Search ........................ 359/15, 567, 568, 359/569; 349/64, 67, 61, 5–9; 353/31, 38

(56) References Cited

U.S. PATENT DOCUMENTS

| 5,181,054 A | | 1/1993 | Nicolas et al. |
|---|---|---|---|
| 5,206,674 A | | 4/1993 | Puech et al. |
| 5,299,036 A | | 3/1994 | Nicolas et al. |
| 5,410,421 A | | 4/1995 | Huignard et al. |
| 5,416,617 A | | 5/1995 | Loseaux et al. |
| 5,467,206 A | | 11/1995 | Loiseaux et al. |
| 5,506,701 A | * | 4/1996 | Ichikawa ...................... 359/15 |
| 5,526,063 A | | 6/1996 | Joubert et al. |
| 5,526,145 A | * | 6/1996 | Weber ......................... 359/15 |
| 5,546,200 A | | 8/1996 | Nicolas et al. |
| 5,594,563 A | * | 1/1997 | Larson ........................ 349/96 |
| 5,621,547 A | | 4/1997 | Loiseaux et al. |

FOREIGN PATENT DOCUMENTS

| EP | 633 792 A! | * | 1/1995 |
| EP | 692 730 A2 | * | 1/1996 |
| FR | 2699688 | * | 6/1994 |

* cited by examiner

Primary Examiner—Jon Henry
(74) Attorney, Agent, or Firm—Oblon, Spivak, McClelland, Maier & Neustadt, P.C.

(57) ABSTRACT

Color display system, which includes an electrooptic modulation screen (LCD) and in which a chromatic modulator (RC) is provided between the multiple-wavelength light source (S, C) and the screen (LCD). This chromatic modulator modulates a wavelength or a restricted range of wavelengths of the source in order to adjust the saturation of the various primaries transmitted to the screen as well as to effect colorimetric balance. Applications include liquid-crystal color displays.

9 Claims, 2 Drawing Sheets

ILLUMINATION SYSTEM FOR AN ELECTROOPTIC COLOR DISPLAY SCREEN

BACKGROUND OF THE INVENTION

1. Field of the Invention

The invention relates to an illumination system for an electrooptic colour display screen and especially a liquid-crystal trichrome projector. The object of this system is to improve the colorimetric performance of a liquid-crystal projector.

2. Discussion of the Background

In a trichrome projector it is advantageous to obtain trichromatic ranges which are as saturated as possible in order to increase the reproduced colour shades of the image and to approach as far as possible the colorimetric content of the picture. It is therefore necessary first to choose the lighting sources judiciously.

However, one of the main limitations of liquid-crystal projection devices is provided by the illumination device. This limitation stems partly from the limited choice of white sources compatible with this application. This is because white sources must simultaneously satisfy the criteria of high light efficiency, of stability of their colorimetry and of a long lifetime, as well as meeting cost requirements. It appears that currently arc lamps of the metal-halide type constitute the best compromise between these criteria.

These arc lamps are more particularly developed for cinema projection exhibiting a colorimetry suitable for this application since its chromatic coordinates x/y are very close to those of the television standard reference "white".

In order to be used in a liquid-crystal projector, the light emitted by these arc lamps must undergo chromatic separation so as to obtain various beams having different wavelength ranges.

In a known manner, three beams, in the green, the blue and the red, are extracted from the beam emitted by the lamp.

This chromatic separation may be performed using dichroic mirrors, as is described in French Patent No. 92/15382, so as to obtain separate mono-chromatic beams each illuminating a liquid-crystal screen. The light emitted by the various screens is then mixed so as to superimpose the images produced by these screens.

Chromatic separation may also be performed by means of a spatio-chromatic separation system which separates the various wavelength ranges into angularly different directions. A single liquid-crystal screen is then used in which each image element (dot) possesses as many elementary display elements (pixels) as there are wavelength ranges. Typically, a dot therefore possesses one image element for red, one for blue and one for green. French Patent Application No. 93/08470 describes one embodiment of such a system.

However, the reproduction of a colour image, by means of image elements each emitting a primary colour, requires that each primary be suitably saturated, that is to say that the wavelengths which it contains form a primary colour close to the TV standard. In addition, it is necessary that the energy level of each primary be matched. This is what is called colorimetric balance. French Patent Application No. 92/15382 describes a device in which a filter is provided which allows complete elimination or almost complete elimination (to an extent up to or exceeding 84%) of certain undesirable wavelengths having a contaminating effect, in the colorimetric sense, on the saturation of a primary. For example, this pertains to elimination, in some lamps, of a very intense wavelength close to 570 nm, corresponding to yellow. This device thus allows elimination of wavelengths prejudicial to the purity of the primary wavelengths and therefore contributes to obtaining good saturation of these primaries.

However, it appears that the elimination of certain wavelengths decreases the energy level of the primary band to which they belong. Likewise, it is observed that the energy level of certain primaries should be reduced compared to the energy level of the other primaries (colorimetric balance) without correspondingly eliminating wavelengths. For example, in the beam emitted by some lamps, it may be advantageous to reduce the light intensity at the wavelength of yellow in order to decrease the overall intensity of the green primary.

SUMMARY OF THE INVENTION

The invention provides a solution to such a problem.

The invention therefore relates to an illumination system for an electrooptic colour display screen, comprising:

a polychrome light source;

a chromatic separation system receiving a polychrome light beam coming from the source and transmitting several illuminating light beams having different wavelength ranges and in different directions;

an electrooptic display screen, each image element or dot having as many display elements (pixels) as there are illuminating light beams;

characterized in that it includes at least one chromatic modulation device lying between the source and the display screen, this device being tuned to a particular wavelength and transmitting a defined part of the light energy which it receives at this wavelength to the display screen.

BRIEF DESCRIPTION OF THE DRAWINGS

The various objects and characteristics of the invention will appear more clearly in the description which follows and in the appended figures which represent.

DESCRIPTION OF THE PREFERRED EMBODIMENTS

Figure 1:
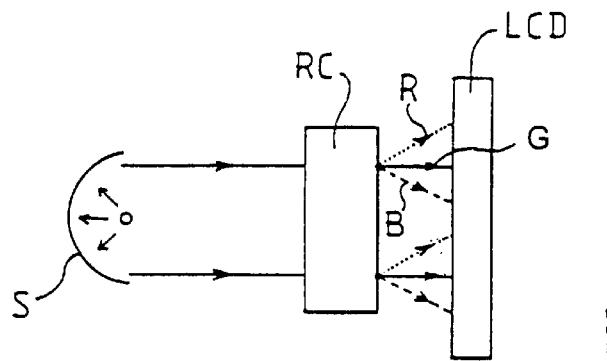
FIG. 1, a general diagram of a colour display device which has only a single liquid-crystal screen and one spatio-chromatic separation device.

A colour display system providing angular separation of the colours includes, as shown in FIG. 1:

a source S which emits a polychrome beam, preferably a beam the composition of whose various wavelengths provides a white colour;

a chromatic separator RC which receives the beam emitted by the source and separates various wavelength ranges, each corresponding to a range of colours, so as to transmit several beams in different directions. For example, it transmits three chromatic beams R, G and B corresponding, respectively, to red, green and blue;

a liquid-crystal screen LCD which receives the various chromatic beams. Certain image elements of the screen are illuminated by the beam R, others by the beam G and finally others by the beam B.

Figure 2A:
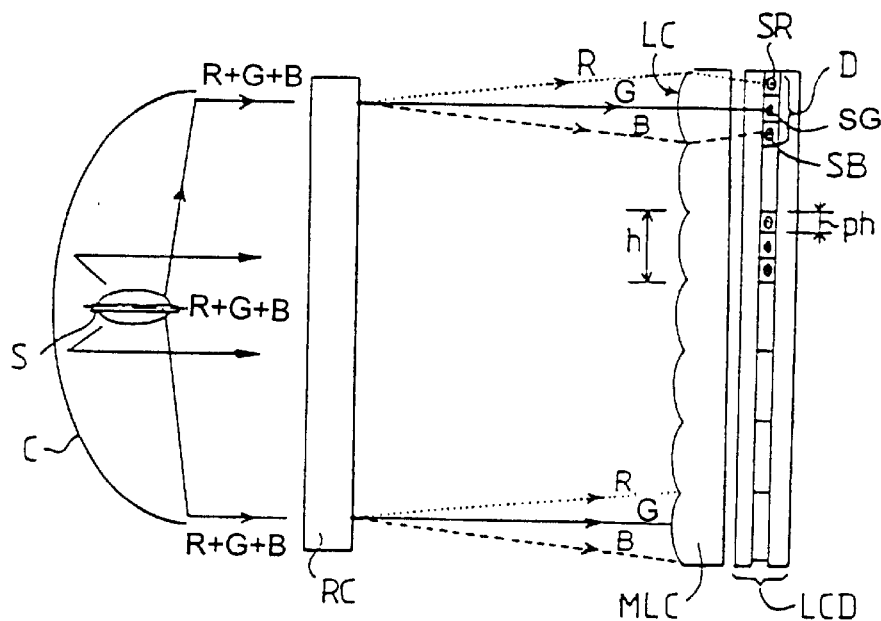
FIGS. 2a and 2b an embodiment of the device in FIG. 1.

FIG. 2a shows an embodiment of the system in FIG. 1. This system includes:

an illuminating white source S which includes an optical system C of the known art for collimating the light emitted by the lamp;

a chromatic separator element RC which allows angular separation of the three primaries, red, green, blue (R, G, B), of the source S in three chosen directions. This separator is optically recorded in a photosensitive material and then consists of phase microstructures (variations in indices or reliefs);

a grating of cylindrical microlenses MLC which is placed in front of the screen LCD (possibly directly against the backing plate of the LCD);

a liquid-crystal screen (LCD) devoid of colour filters, which spatially modulates the illuminating source as a function of the trichrome video signals R, G, B.

The principle of operation of the device may be described as follows: the function of the separator RC is to angularly separate the three spectral components of the collimated illuminating source. These three spectral bands are then focused along three parallel colour lines in the focal plane of each cylindrical lens. According to the embodiment in FIG. 2a, the beam G, of green colour, is normal to the focal plane of the lenses MLC and the beams R and B (red and blue) are symmetrical with respect to this normal and make an angle of incidence $\theta_i$. Consequently, by adapting, on the one hand, the angle of incidence $\theta_i$ of each spectral component on the cylindrical microlenses and, on the other hand, the focal length f of these microlenses, it is possible simultaneously:

to focus each colour in succession in the plane of the liquid crystal, this focusing being centered on each subpixel addressed by the same colour. The characteristics $\theta_i$ and f of the device depend on the size of the screen LCD, on the number of pixels and on the distribution of the subpixels in a dot.

Figure 2B:
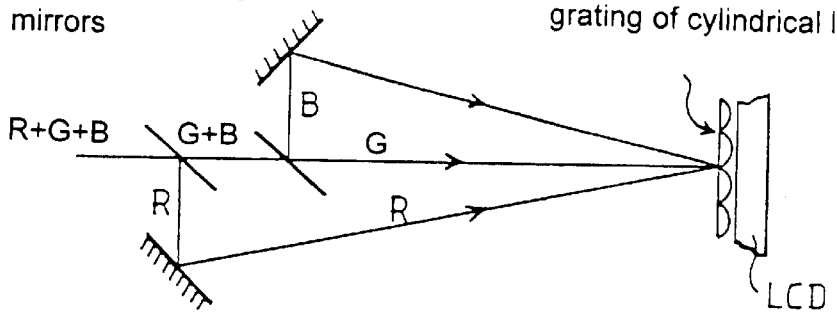

The chromatic separator RC may be produced according to other principles, such as chromatic dispersion obtained with a prism. The separator RC is then a prism. It is also possible to use a combination of dichroic mirrors, as shown in FIG. 2b.

However, as was explained previously, the invention is designed to produce colorimetric balance, both in terms of wavelength compositions and in terms of light intensities of the various colour ranges. To do this, the invention is designed to modulate the light intensity of certain wavelengths. One or more suitably recorded filters reflect or absorb all or a predetermined part of the light in certain wavelengths.

Figure 3A:
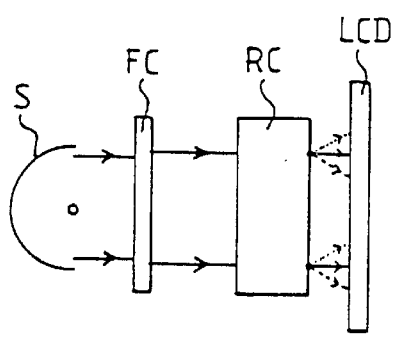
FIGS. 3a and 3b, the examples of application of the system of the invention to the device in FIG. 1.

According to FIG. 3, a filter or chromatic modulator FC performing this function is placed between the source S and the spatio-chromatic separator RC.

Figure 3B:
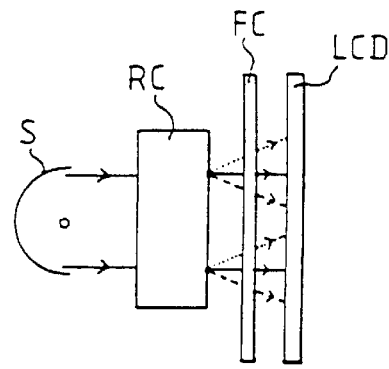

According to FIG. 3b, the chromatic modulator FC is placed between the spatio-chromatic separator and the screen LCD.

Figure 4:
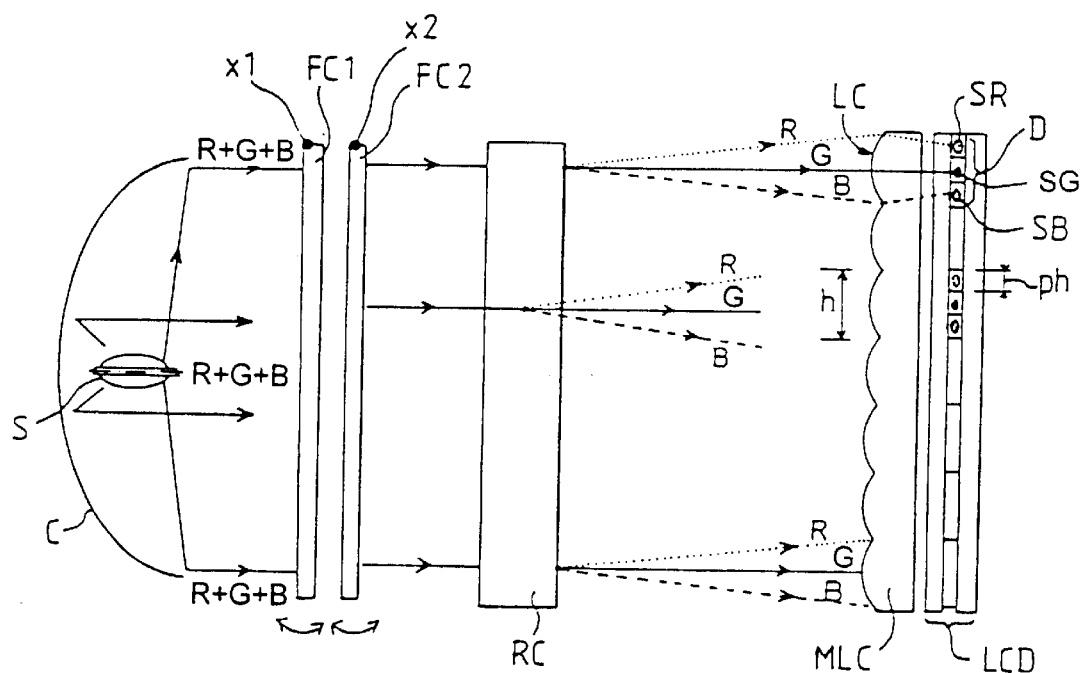
FIG. 4, a detailed embodiment according to the invention with two chromatic modulators according to the invention.

FIG. 4 shows a detailed embodiment of the system of the invention. This system repeats the elements of the system in FIG. 2a. It furthermore includes one or more chromatic modulators FC1, FC2. Each modulator is designed to be transparent at all wavelengths, except at a wavelength or a restricted range of wavelengths about a central wavelength which it allows to be transmitted only with a defined part of the energy.

Each chromatic modulator FC1, FC2 can rotate about an axis x1, x2 which is perpendicular to the direction of propagation of the light which it modulates. This therefore makes it possible to shift the central wavelength of the modulated range.

A chromatic modulator FC1, FC2 may be produced in materials such as dichromated gelatine or photopolymers.

The projection device of the invention therefore makes it possible, by using holographic components for the modulators FC1, FC2, for the chromatic coordinates of the three primaries R, G, B, and their respective intensities in a liquid-crystal projector to be adjusted simply.

It should be noted that the spatio-chromatic separator RC in FIG. 4 may also be produced using the techniques of holography. A holographic component, in dichromated gelatine, may be recorded in such a way that, on receiving a R+G+B beam in a first direction, for example:

it diffracts a beam R, corresponding to the red primary, in a second direction;

it causes no deviation of the green component (transmission of the beam G in the first direction);

it diffracts a beam B, corresponding to the blue primary, in a third direction, the second and third directions being symmetrical with respect to the first.

On exiting the separator RC, a beam G of green colour is therefore directed in the first direction, a beam R of red colour in the second direction and a beam B of blue colour in the third direction.

The fact of eliminating or modulating certain spectral bands upstream of the chromatic separator removes certain constraints on the production of the chromatic separator, especially when it consists of dichroic mirrors or colour filters. These may therefore have less deeply inclined passband edges, something which is less expensive to produce. Or, for not necessarily optimized equal transmission, the primary will then be more saturated if a holographic rejecter component is used.

When the red, green, blue chromatic separation is performed by a spatio-chromatic separator component, the spectrum of the lamp is locally spread out over an area corresponding to three contiguous pixels, thus forming three, red, green and blue, pixels. In this configuration too, it is expedient to eliminate certain spectral bands. Spatial chromatic filtering is performed by the Black Matrix of the LCD, but the use of holographic modulator filters may prove to be useful for the colorimetry:

in the case, for example, of peaks, such as the yellow peak, in the spectrum of metal-halide lamps;

in order to eliminate the outermost bands from the visible spectrum (violet, for example), which, because of the spatial spreading-out of the wavelengths, may lie on the adjacent pixel (red, in the example) and contaminate the colorimetry thereof.

We also note that, in a conventional monochrome or trichrome LCD architecture, the use of a "violet cut-off" holographic filter may allow the constraints on the bandwidth of the UV filter, used with all metal-halide lamps for example, to be relaxed, which allows an appreciable increase in its transmission in the visible (fewer dielectric layers necessary).

The above invention has been applied to a system which includes a spatio-chromatic separation device. However, the invention is also applicable to a system in which the chromatic separation is performed using colour filters. For example, it is possible to provide one liquid-crystal screen per primary and to associate a colour filter with each screen. The images delivered by the various screens are then combined in order to obtain a colour image.

What is claimed is:

1. An illumination system for an electrooptic colour display screen, comprising:

a polychrome light source;

a spatio-chromatic separation system receiving a polychrome light beam coming from said polychrome light source and transmitting a plurality of illuminating light beams having different wavelength ranges and in different directions;

an electrooptic display screen having a plurality of image elements, each one of said plurality of image elements having a plurality of display elements; and at least one chromatic modulation device provided between said polychrome light source and said display screen, said at least one chromatic modulation device being tuned to a predetermined wavelength and transmitting a predetermined portion of light energy which it receives at said predetermined wavelength to said display screen, wherein each one of said plurality of image elements has a number of said plurality of display elements equal to a number of said plurality of illuminating light beams, and wherein said spatio-chromatic separation system is a holographic device receiving a beam containing a plurality of primary beams and transmitting each one of said plurality of primary beams in a respective different direction.

2. The illumination system according to claim 1, further including a grating of cylindrical micro-lenses placed in front of said display screen.

3. The illumination system according to claim 2, wherein said grating of micro-lenses is positioned against a backing plate of said display screen.

4. System according to claim 1, wherein said chromatic separation system includes colour filters.

5. System according to claim 1, characterized in that the chromatic modulation device lies between the source and the spatio chromatic separation system.

6. System according to claim 1, wherein said at least one chromatic modulation device includes at least one holographic device.

7. System according to claim 6, wherein said at least one chromatic modulation device is movable about an axis orthogonal to a direction of propagation of a light beam to be modulated.

8. System according to claim 6, wherein said at least one chromatic modulation device operates over a narrow wavelength range to reject a predetermined proportion of light which it receives in said narrow wavelength range.

9. System according to claim 8, wherein the wavelength range of said predetermined proportion of light to be rejected is centered on yellow.

* * * * *

UNITED STATES PATENT AND TRADEMARK OFFICE
CERTIFICATE OF CORRECTION

PATENT NO. : 6,426,810 B1
DATED : July 30, 2002
INVENTOR(S) : Joubert et al.

It is certified that error appears in the above-identified patent and that said Letters Patent is hereby corrected as shown below:

<u>Title page,</u>
Item [*] Notice, delete "0" and insert -- 889 --.

Signed and Sealed this

Eleventh Day of April, 2006

JON W. DUDAS
*Director of the United States Patent and Trademark Office*